(12) United States Patent
Weksler et al.

(10) Patent No.: US 10,733,377 B2
(45) Date of Patent: Aug. 4, 2020

(54) INDICATING AUTOMATICALLY CORRECTED WORDS

(71) Applicant: Lenovo (Singapore) Pte. Ltd., Singapore (SG)

(72) Inventors: Arnold S. Weksler, Raleigh, NC (US); Russell Speight VanBlon, Raleigh, NC (US); Nathan J. Peterson, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 190 days.

(21) Appl. No.: 13/960,059

(22) Filed: Aug. 6, 2013

(65) Prior Publication Data
US 2015/0046804 A1    Feb. 12, 2015

(51) Int. Cl.
*G06F 17/20* (2006.01)
*G06F 40/232* (2020.01)
*G06F 40/103* (2020.01)

(52) U.S. Cl.
CPC .......... *G06F 40/232* (2020.01); *G06F 40/103* (2020.01)

(58) Field of Classification Search
CPC ..... G06F 17/273; G06F 17/276; G06F 17/274
See application file for complete search history.

(56) References Cited

U.S. PATENT DOCUMENTS

| | | | | |
|---|---|---|---|---|
| 5,778,402 A * | 7/1998 | Gipson | G06F 17/21 715/201 |
| 5,940,847 A * | 8/1999 | Fein | G06F 17/21 715/236 |
| 6,047,300 A * | 4/2000 | Walfish | G06F 17/273 715/257 |
| 6,583,798 B1 * | 6/2003 | Hoek | G06F 17/24 715/210 |
| 7,296,019 B1 * | 11/2007 | Chandrasekar | G06F 17/273 |
| 8,102,368 B2 | 1/2012 | Fux et al. | |
| 8,547,329 B2 | 10/2013 | Fux et al. | |
| 2005/0076012 A1 * | 4/2005 | Manber | G06Q 30/02 |
| 2010/0271311 A1 | 10/2010 | Fux et al. | |
| 2011/0202836 A1 * | 8/2011 | Badger | G06F 3/0237 715/702 |
| 2011/0202876 A1 * | 8/2011 | Badger | G06F 3/0237 715/816 |
| 2012/0086646 A1 | 4/2012 | Fux | |
| 2013/0151956 A1 * | 6/2013 | Allen | G06F 17/273 715/256 |
| 2014/0055365 A1 | 2/2014 | Fux et al. | |
| 2014/0278361 A1 * | 9/2014 | Pak | G06F 17/273 704/9 |

FOREIGN PATENT DOCUMENTS

DE    112007000727 T5    2/2009
WO    WO-20070112541 A1    10/2007

* cited by examiner

*Primary Examiner* — Shahid K Khan
(74) *Attorney, Agent, or Firm* — Ference & Associates LLC

(57) ABSTRACT

A method includes receiving an indication in an information handling device of an autocorrected word in a string of text, and providing an indication proximate the autocorrected word to a display.

11 Claims, 2 Drawing Sheets

INDICATING AUTOMATICALLY CORRECTED WORDS

BACKGROUND

When typing text, many applications may automatically correct words, sometimes replacing an intended word with a different word. Such replaced words may significantly change the meaning of the text. When looking away from the screen while typing, a user may not notice the change. Sometimes, by the very nature of the change, a user may not be able to proof read the text very well, as the human brain tends to see intended words, and not catch misspellings. This can lead to the sending of emails and documents that are in error and potentially confusing, if not misleading.

SUMMARY

A method includes receiving an indication in an information handling system of an autocorrected word in a string of text, and providing an indication proximate the autocorrected word to a display.

A computer readable storage device embodies computer program code, said computer program code comprising computer-executable instructions configured for causing a computer to implement a method. The method includes receiving an indication in a computer program running on a computer of an autocorrected word in a string of text, and providing an indication proximate the autocorrected word to a display.

A system includes a display and a text entry device to enter text. A processor is coupled to the text entry device to generate a signal for display of the text on the display and to provide autocorrecting for text strings. A monitor is used to monitor autocorrecting of text strings and provide for indicating that a text string has been autocorrected when the text string is displayed on the display.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

A system and method provides an indication of when a string of text, such as a word has been autocorrected in a communication such as a document, spreadsheet, email, text message, tweet, or other type of communication. The indication calls a user's attention to the change without the user having to carefully read displayed text to ensure that autocorrected words are in fact the intended word in a document, email, or other string of text. Strings of text which may be autocorrected include names of people for example. There are many other times an entered word may not be in a dictionary of an application, and may result in an autocorrection that completely changes the meaning of a communication or makes no sense in the context of the communication.

Figure 1:
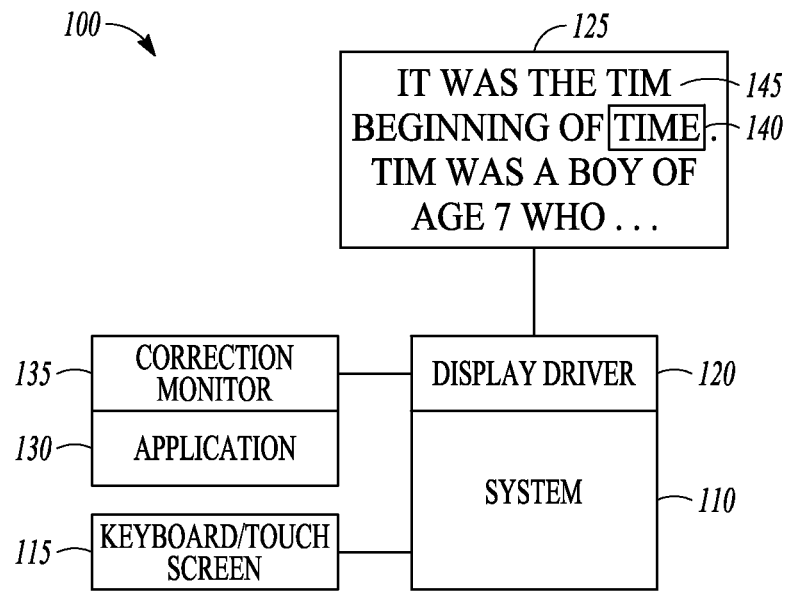
FIG. 1 is a block diagram of a system providing for indications of autocorrected text strings according to an example embodiment.

FIG. 1 is a block diagram of a system 100 providing for indications of autocorrected text strings according to an example embodiment. A computer system 110 is coupled to a keyboard 115 to receive text. In various embodiments, the computer system may include a processor suitable for use in a laptop computer, desktop computer, tablet computer, smart phone computer, and others. In addition, the keyboard 115 represents many different types of text entry devices, such as a common qwerty keyboard, touchscreen with a displayed keyboard, smartphone buttons corresponding to keys, and microphone for receiving dictation and generating text from the dictation. In addition, various methods of entering text may include pressing discrete keys as in common typing, using a sliding method, such as swipe (note the autocorrect changed this word from the text that was typed, "swype" to the word "swipe"), and dictation. If the drafter of the application had not been paying attention, the change caused by the word processing application would have gone unnoticed.

As text is entered, the system 110 utilizes a display driver 120 to display text on a monitor 125. The text is also processed by an app or application 130, such as a word processing application, spreadsheet, smart phone, or other application running on any of the variety of systems mentioned. The application 130 provides the corrected text string, usually in the form of a word known to the application, to the display driver 120 for display in place of the corrected text string. As the application 130 performs autocorrection of text strings, a correction monitor 135 may be used to monitor such corrections.

The correction monitor 135 may operate in one of two different modes. In a first mode, the correction monitor 135 receives the entered text from the system 110, and also receives the autocorrected text from application 130. The correction monitor 135 then compares the entered text with the corrected words generated by the application 130 to determine when an auto correction occurs, and also identifies both the autocorrected word as indicated at 140 and optionally the corresponding text string at 145 resulting in the autocorrected word. The correction monitor 135 then indicates the autocorrected word such as by applying a text attribute to it, such as bold, blinking, highlighting, a box around the word, a different color, italics, underlining, or other types of attributes which may call attention to the autocorrected word to the entity that entered the text.

In a further embodiment, the correction monitor 135 may be integrated into, or use application programming interfaces of the application 130. The correction monitor 135 receives an indication of a text string being autocorrected directly from the application 130, allowing the correction monitor 135 to avoid having to do a comparison of information from two different sources. In still further embodiments, the correction monitor 135 may be an add-on to a user interface program that receives input from a user via keyboard or touchscreen and also provides the text to the display device for display. By such a configuration, the correction monitor 135 receives both the input text strings and the text for display from the user interface program. In still further embodiments, code for the correction monitor 135 may be positioned and executed anywhere it can receive sufficient information to perform the identified functions.

In some embodiments, the string of text that was autocorrected into a word may be used as the indication by displaying it proximate to the autocorrected word. Proximate to may be include placing the string of text above, below, or beside to autocorrected word with or without an attribute to call attention to the string of text. In further embodiments, the autocorrected word may include a link, that when selected results in pop up window or menu to allow selection of the entered string, autocorrected word, or other likely suggestions.

Figure 2:
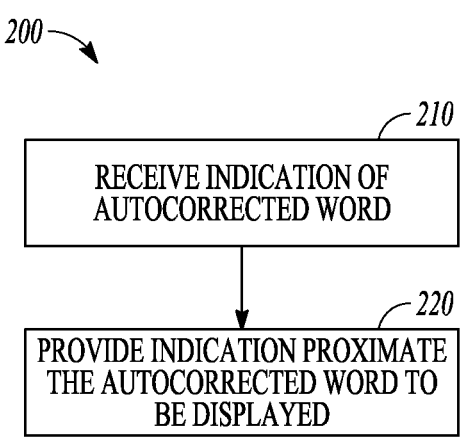
FIG. 2 is a flowchart illustrating a method of providing indications of autocorrected words according to an example embodiment.

FIG. 2 is a flowchart illustrating a method 200 of providing indications of autocorrected words according to an example embodiment. At 210, an indication of an autocorrected word is received. As indicated above, such an indication may be received from the application or other program that corrects a text string into an autocorrected word, or may be generated via the correction monitor 135. At 220, an indication is provided proximate to the autocorrected word for display to call a user's attention to the autocorrected word. The indication may be any type of attribute applied to the word. In some embodiments, the indication may be made, or a menu providing a list of alternatives for the entered text, including the entered text itself. The prompt may be an option that is selectable by a user in some embodiments, as may the type of attribute to apply to display of an autocorrected word.

Figure 3:
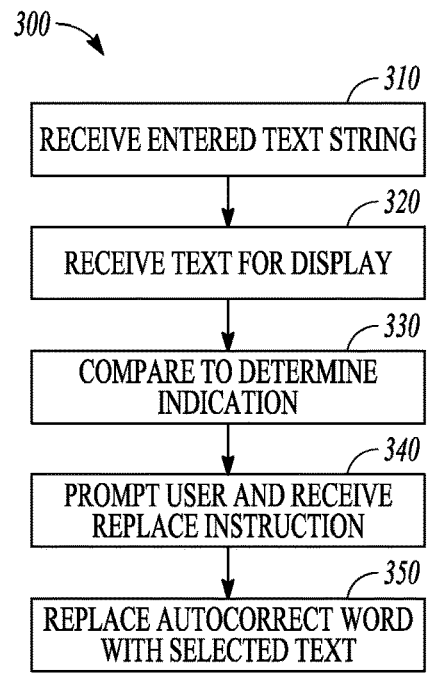
FIG. 3 is a flowchart illustrating further detail of a method of providing indications of autocorrected text strings according to an example embodiment.

FIG. 3 is a flowchart illustrating further detail of a method 300 of providing indications of autocorrected text strings according to an example embodiment. At 310, an entered text string is received. The text string may be received directly from a text entry device, from a processor, from a display driver or from another other source where available. At 320, autocorrected text to be displayed is provided from any available source, such as the application or display driver. In some embodiments, the entered text string may be temporarily displayed while the application or other software is attempting to determine if the string should be autocorrected with a known word. The user in many cases, may not notice the change from the text string to the autocorrected word unless the user happens to be looking directly at the text being typed. Experienced touch typists and those that dictate may not be looking at the text while typing, meaning that they are unlikely to notice the change until the text is proofed. Even after proofing, if done, the user may not notice the change.

At 330, the entered text string is compared to the received text to be displayed. If there is a difference, the received text to be displayed, such as an autocorrected word is derived from the text string simply by identifying discrete strings of the entered text, and where a string of displayed text is different, identifying the different string as an autocorrected word via a display attribute. In some embodiments, the user may be prompted at 340 to select whether or not to accept the autocorrected word or proceed with the entered text. Alternative prompts may provide selectable options to replace the autocorrected word with different words or the entered text string. Upon receive of an instruction by the user, the autocorrected word is replaced with selected text at 350.

Figure 4:
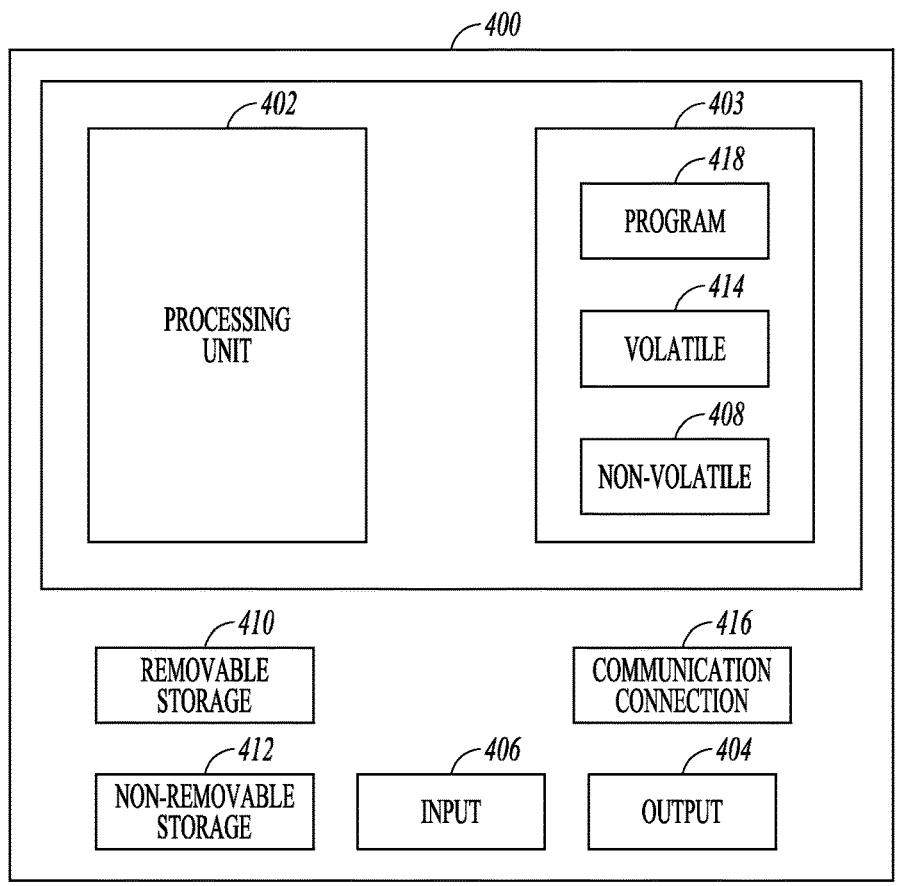
FIG. 4 is a block diagram of an example computer system for implementing one or more embodiments.

FIG. 4 is a block schematic diagram of an information handling system such as a computer system 400 to implement one or more example embodiments. In one embodiment, multiple such computer systems are utilized in a distributed network to implement multiple components in a transaction based environment. An object-oriented, service-oriented, or other architecture may be used to implement such functions and communicate between the multiple systems and components. One example computing device in the form of a computer 400, may include a processing unit 402, memory 403, removable storage 410, and non-removable storage 412. Memory 403 may include volatile memory 414 and non-volatile memory 408. Computer 400 may include—or have access to a computing environment that includes—a variety of computer-readable media, such as volatile memory 414 and non-volatile memory 408, removable storage 410 and non-removable storage 412. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 400 may include or have access to a computing environment that includes input 406, output 404, and a communication connection 416. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium such as a storage device embodying computer program code are executable by the processing unit 402 of the computer 400. A hard drive, CD-ROM, and RAM are some examples of articles including a non-transitory computer-readable medium. For example, a computer program 418 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 400 to provide generic access controls in a COM based computer network system having multiple users and servers.

EXAMPLES

1. A method comprising:
   receiving an indication in an information handling system of an autocorrected word in a string of text; and
   providing an indication proximate the autocorrected word to a display.

2. The method of example 1 wherein the provided indication comprises a text attribute.

3. The method of example 2 wherein the text attribute comprises highlighting, bold, or blinking.

4. The method of any of examples 1-3 wherein receiving an indication of an autocorrected word in a string of text comprises:
   receiving entered text strings;
   receiving text for display; and
   comparing the received entered text strings to the received text for display to determine the indication to display.

5. The method of any of examples 1-4 wherein the string of text comprises additional characters around the autocorrected word.

6. The method of any of examples 1-5 and further comprising providing an entered string of text in addition to the autocorrected word to a display.

7. The method of any of examples 1-6 and further comprising providing a prompt to accept the autocorrected word or replace the autocorrected word.

8. The method of example 7 wherein the entered string is generated for display proximate to the autocorrected word and provided in a cursor selectable form for replacing the autocorrected word.

9. A computer readable storage device embodying computer program code, said computer program code comprising computer-executable instructions configured for:
   receiving an indication in a computer program running on a computer of an autocorrected word in a string of text; and
   providing an indication proximate the autocorrected word to a display.

10. The computer readable storage device of example 9 wherein the indication comprises a text attribute.

11. The computer readable storage device of example 10 wherein the text attribute is selected from the group consisting of highlighting, bold, italics, underlining, color, and blinking.

12. The computer readable storage device of any of examples 9-11 wherein the indication comprises a box around the autocorrected word.

13. The computer readable storage device of any of examples 9-12 wherein the method further comprises providing an entered string of text in addition to the autocorrected word to a display.

14. The computer readable storage device of example 13 wherein the method further comprises providing a mechanism to replace the autocorrected word with the entered string of text.

15. The computer readable storage device of example 14 wherein the entered string is generated for display proximate to the autocorrected word and provided in a cursor selectable form for replacing the autocorrected word.

16. A system comprising:
   a display;
   a text entry device to enter text;
   a processor coupled to the text entry device to generate a signal for display of the text on the display and to provide autocorrecting for text strings; and
   a monitor to monitor autocorrecting of text strings and provide for indicating that a text string has been autocorrected when the text string is displayed on the display.

17. The system of example 16 wherein the text entry device comprises a keyboard and wherein an application running on the processor provides the autocorrecting for text strings.

18. The system of any of examples 16-17 wherein the text entry device comprises a touch screen.

19. The system of any of examples 16-18 wherein the monitor is coupled to receive text strings entered via the text entry device, to receive autocorrected text strings, and to provide the indication of the autocorrected text strings for display.

20. The system of any of examples 16-19 wherein the monitor is coupled to compare the received entered text strings and the autocorrected text strings to identify autocorrected text.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer-implemented method comprising:
   receiving a first text string comprising an uncorrected word, entered by a user for use within a communication application, directly from a text entry device;
   receiving a second text string to be displayed, corresponding to the first text string, from the communication application;
   identifying an autocorrected word in the second text string by comparing the first text string with the second text string and determining that the first text string and second text string are different, the second text string being a result of autocorrecting the uncorrected word in the first text string;
   applying a text attribute to the autocorrected word in the second text string;
   providing, to a display, the second text string with the text attribute applied to the autocorrected word, wherein the displayed autocorrected word comprises a selection link that, when selected, provides proximate to the autocorrected word a menu including the uncorrected word and other word suggestions;
   detecting a user selection of the selection link and the uncorrected word; and
   responsive to the detection of the user selection of the uncorrected word, replacing, on the display, the autocorrected word with the uncorrected word.

2. The computer-implemented method of claim 1, wherein the text attribute comprises a highlighting, bolding, or blinking applied to the autocorrected word.

3. The computer-implemented method of claim 1, wherein the second text string comprises additional characters around the autocorrected word.

4. The computer-implemented method of claim 1, wherein the uncorrected word is generated for display proximate to the autocorrected word and provided in a cursor-selectable form for replacing the autocorrected word.

5. A non-transitory computer readable storage device having instructions for causing a computer to implement a method, the method comprising:
- receiving a first text string comprising an uncorrected word, entered by a user for use within a communication application, directly from a text entry device;
- receiving a second text string to be displayed, corresponding to the first text string, from the communication application;
- identifying an autocorrected word in the second text string by comparing the first text string with the second text string and determining that the first text string and second text string are different, the second text string being a result of autocorrecting the uncorrected word in the first text string;
- applying a text attribute to the autocorrected word in the second text string;
- providing, to a display, the second text string with the text attribute applied to the autocorrected word, wherein the displayed autocorrected word comprises a selection link that, when selected, provides proximate to the autocorrected word a menu including the uncorrected word and other word suggestions;
- detecting a user selection of the selection link and the uncorrected word; and
- responsive to the detection of the user selection of the uncorrected word, replacing, on the display, the autocorrected word with the uncorrected word.

6. The non-transitory computer readable storage device of claim 5, wherein the text attribute is selected from the group consisting of highlighting, bolding, italicizing, underlining, coloring, and blinking and is applied to the autocorrected word such that each character of the autocorrected word has the text attribute.

7. The non-transitory computer readable storage device of claim 5, wherein the indication comprises a box around the autocorrected word.

8. The non-transitory computer readable storage device of claim 5, wherein the uncorrected word is generated for display proximate to the autocorrected word and provided in a cursor-selectable form for replacing the autocorrected word.

9. A system, comprising:
- a processor;
- a memory device that stores instructions executable by the processor to:
- receive, directly at an input device, a first text string comprising an uncorrected word, entered by a user for use within a communication application;
- receive a second text string to be displayed on a display device, corresponding to the first text string, from the communication application;
- identify an autocorrected word in the second text string by comparing the first text string with the second text string and determining that the first text string and second text string are different, the second text string being a result of autocorrecting the uncorrected word in the first text string;
- apply a text attribute to the autocorrected word in the second text string;
- provide, to the display device, the second text string with the text attribute applied to the autocorrected word, wherein the displayed autocorrected word comprises a selection link that, when selected, provides proximate to the autocorrected word a menu including the uncorrected word and other word suggestions;
- detect a user selection of the selection link and the uncorrected word; and
- responsive to the detection of the user selection of the uncorrected word, replace, on the display device, the autocorrected word with the uncorrected word.

10. The system of claim 9, wherein the text attribute is selected from the group consisting of: highlighting, bolding, italicizing, underlining, coloring, and blinking.

11. The system of claim 9, further comprising instructions executable by the processor to detect a user selection of a word suggestion from the selection link and to replace the autocorrected word with the selected word suggestion the selected word suggestion is displayed and the autocorrected word is not displayed.

* * * * *